United States Patent [19]

Fazio

[11] Patent Number: 4,486,554

[45] Date of Patent: Dec. 4, 1984

[54] PREPARATION OF ANIONIC AND CATIONIC POLYMERS FROM 2-OXAZOLINES

[75] Inventor: Michael J. Fazio, Midland, Mich.

[73] Assignee: The Dow Chemical Company, Midland, Mich.

[21] Appl. No.: 524,719

[22] Filed: Aug. 19, 1983

[51] Int. Cl.$^3$ .............................................. C08F 8/32
[52] U.S. Cl. ................................ 525/279; 525/326.8; 525/359.1; 525/359.2; 525/379; 525/381; 525/382
[58] Field of Search ................. 525/279, 326.8, 359.1, 525/359.2, 379, 381, 382

[56] References Cited

U.S. PATENT DOCUMENTS

| | | | |
|---|---|---|---|
| 2,677,297 | 3/1954 | Lott | 260/473 |
| 2,723,256 | 11/1955 | Hayek | 260/79.3 |
| 3,008,851 | 11/1961 | Shimizu et al. | 117/138.8 |
| 3,505,297 | 4/1970 | Sheetz et al. | 525/326.8 |
| 3,547,899 | 12/1970 | Arit et al. | 260/79.3 |
| 3,679,000 | 7/1972 | Kaufman | 166/273 |
| 3,758,445 | 9/1973 | Cohen et al. | 260/78 SC |
| 3,768,565 | 10/1973 | Persinski et al. | 166/308 |
| 3,898,037 | 8/1975 | Lange et al. | 21/2.7 R |
| 4,011,376 | 3/1977 | Tomalia et al. | 526/11.1 |
| 4,144,211 | 3/1979 | Chamberlin et al. | 578/403 |
| 4,245,003 | 1/1981 | Thill et al. | 525/326.8 |
| 4,284,517 | 8/1981 | Chen et al. | 252/8.55 D |
| 4,317,893 | 3/1982 | Chen et al. | 525/328 |

FOREIGN PATENT DOCUMENTS 1134050 11/1968 United Kingdom .

Primary Examiner—Joseph L. Schofer
Assistant Examiner—Bernard Lipman

[57] ABSTRACT

Anionic and cationic polymers are prepared by vinyl polymerizing a 2-alkenyloxazoline or 2-alkenyloxazine and reacting the resulting polymer which contains pendant oxazoline or oxazine moieties with a monobasic salt of sulfurous acid or a tertiary amine salt. Optionally, the 2-alkenyloxazoline or 2-alkenyloxazine can be polymerized with another ethylenically unsaturated monomer and/or a small amount of polyvinyl crosslinking monomer; and the resulting polymer is reacted with the desired salt to yield an anionic or cationic polymer.

10 Claims, No Drawings

PREPARATION OF ANIONIC AND CATIONIC POLYMERS FROM 2-OXAZOLINES

BACKGROUND OF THE INVENTION

This invention relates to a novel process for preparing anionic and cationic polymers.

Cationic polymers are widely employed in water treatment, paper making, cosmetics, mineral processing and enhanced oil recovery. The polymers are generally prepared by the polymerization of quaternary ammonium monomers such as diallyldimethyl ammonium chloride, vinyl benzyl trimethyl ammonium chloride, methacryloylethyl trimethyl ammonium chloride, methacrylamidopropyl trimethyl ammonium chloride, and the like.

Anionic polymers are widely employed as dispersants, friction reducers for aqueous fluids, flocculants, and in secondary oil recovery as viscosity modifiers. The polymers are generally prepared by the polymerization of monomers such as vinyl sulfonic acid, allyl sulfonic acid, 2-acryloylamino-2,2-dimethylethane sulfonic acid, and the like, and the corresponding salts thereof.

Cationic or anionic polymers are generally prepared using procedures such as aqueous phase polymerization as described by Schildknecht (II) in *Polymer Process*, Interscience, 191-194 (1956) or disperse aqueous phase polymerization as described by Vanderhoff et al. in U.S. Pat. No. 3,284,393. The compositions of the polymers prepared by the aforementioned processes cannot be easily altered during the reaction process. For example, if one desires to employ various quaternary nitrogen substituents in a cationic polymer, it becomes necessary to copolymerize various monomers.

In view of the deficiencies of the prior art, it would be highly desirable to provide a versatile and convenient process for producing anionic and cationic polymers.

SUMMARY OF THE INVENTION

In one aspect, the present invention is a process for preparing a polymer containing at least one pendant quaternary nitrogen atom wherein a 2-alkenyloxazoline or a 2-alkenyloxazine is subjected to vinyl polymerization and the resulting polymer comprising a pendant 2-oxazoline or 2-oxazine functionality is reacted with at least one tertiary amine salt.

In another aspect, the present invention is a process for preparing a polymer containing at least one pendant sulfonate moiety wherein a 2-alkenyloxazoline or 2-alkenyloxazine is subjected to vinyl polymerization and the resulting polymer comprising a pendant 2-oxazoline or oxazine functionality is reacted with at least one monobasic salt of sulfurous acid.

The process of this invention enables the skilled artisan to conveniently prepare a wide variety of anionic and cationic polymers. That is, this invention discloses a versatile process for preparing polymers having various anionic or cationic functionalities. The polymers prepared by the process disclosed herein are used in a wide variety of applications as is known in the art.

DETAILED DESCRIPTION OF THE INVENTION

The 2-alkenyloxazoline or 2-alkenyloxazines of the present invention have the general formula:

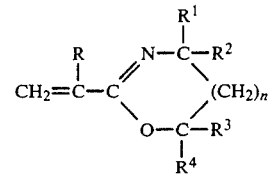

wherein R is hydrogen or lower alkyl, and each of $R^1$–$R^4$ is independently hydrogen, alkyl, aralkyl, phenyl or inertly substituted phenyl; and n is zero or one. Examples of suitable 2-alkenyloxazolines (i.e., oxazoline monomers) and 2-alkenyloxazines (i.e., oxazine monomers), and their methods of preparation are catalogued in U.S. Pat. Nos. 3,505,297 and 4,144,211, which are incorporated herein by reference. Examples of preferred 2-alkenyloxazolines include 2-isopropenyloxazoline, 2-vinyloxazoline, and 5-methyl-2-isopropenyloxazoline.

Examples of monobasic salts of sulfurous acid include, for example, sodium bisulfite, potassium bisulfite, ammonium bisulfite, and the like.

Examples of tertiary nitrogen compounds include, for example, acid salts of tributylamine, triethylamine, triethanolamine, pyridine, dimethyl aniline, and trimethylamine. These tertiary amine salts are readily prepared by mixing stoichiometric amounts of the tertiary amine with protonic acids such as hydrochloric acid, sulfuric acid, phosphoric acid, acetic acid, and the like.

Optionally, at least one other ethylenically unsaturated monomer can be copolymerized with the oxazine or oxazoline monomers. For example, ethylenically unsaturated, water-soluble monomers can be copolymerized with the oxazine or oxazoline monomers. Suitable such monomers for use in the invention are those which are sufficiently water-soluble when dissolved in water and which readily undergo additional polymerization to form polymers which are at least inherently water-dispersible and preferably water-soluble. By "inherently water-dispersible" is meant that the polymer, when contacted with an aqueous medium, will disperse therein without the aid of surfactant to form a colloid dispersion of polymer in the aqueous medium.

Examplary water-soluble monomers preferably include the nonionic monomers and those suitably employed in the practice of this invention are those ethylenically unsaturated monomers that are sufficiently water-soluble to form at least a 5 weight percent solution when dissolved in water and readily undergo addition polymerization to form polymers that are water-soluble. Examples of such nonionic monomers include ethylenically unsaturated amides such as acrylamide, methacrylamide and fumaramide; their water-soluble N-substituted nonionic derivatives such as the N-methylol derivatives of acrylamide and methacrylamide as well as the N-methyl and N,N-dimethyl derivatives of acrylamide and methacrylamide; hydroxyalkyl esters of unsaturated carboxylic acids such as hydroxyethyl acrylate and hydroxypropyl acrylate; and the like. Of the foregoing nonionic monomers, the ethylenically unsaturated amides are preferred, with acrylamide being especially preferred. The acrylamide can also undergo small amounts of hydrolysis after polymerization.

Ethylenically unsaturated water-insoluble monomers can also be copolymerized with the oxazine or oxazoline monomers and with the aforementioned water-soluble monomers. These monomers are well known in the art and, hence, are illustrated below only by representative examples. The nonionic ethylenically unsaturated monomers are represented by, but not restricted to, hydrocarbon monomers such as the styrene compounds; the unsaturated alcohol esters such as vinyl acetate and vinyl propionate; the nonionic derivatives of ethylenically unsaturated carboxylic acids such as acrylic esters which include methyl acrylate, ethyl acrylate, butyl acrylate, hexyl acrylate, 2-ethylhexyl acrylate and lauryl acrylate; methacrylic esters, such as methyl methacrylate and ethyl methacrylate; the maleic esters; and the nitriles, such as acrylonitrile and methacrylonitrile. Nonionic monomers containing halogens which are not activated such as monochlorostyrene, dichlorostyrene, vinyl fluoride, chloroprene, vinyl chloride, vinylidene chloride, and the like, can be employed.

It is also possible to polymerize an oxazine or oxazoline monomer, and/or the aforementioned water-soluble monomers, the water-insoluble monomers and a small amount (i.e., less than about 5 weight percent based on the weight of all monomers) of a polyvinyl crosslinking monomer.

The amounts of water-soluble monomers, water-insoluble monomers and/or polyvinyl crosslinking monomers which are polymerized with the aforementioned oxazoline and oxazine monomers can vary, depending upon the polymer desired.

The aforementioned oxazoline and oxazine polymers, copolymers and terpolymers are readily prepared by conventional procedures such as aqueous phase polymerization as described by Schildknecht (II) in *Polymer Process*, Interscience, 191–194 (1956) or disperse aqueous phase polymerization as described in U.S. Pat. Nos. 3,284,393 and 4,376,850. Normally, such polymerization is carried out in the presence of a polymerization initiator capable of generating free radicals. Preferably, this free radical initiator is employed in amounts from about 0.0001 to about 3 weight percent of initiator based on the monomers and depending on the type of initiator. Exemplary polymerization initiators include the inorganic persulfates such as potassium persulfate, ammonium persulfate and sodium persulfate, azo catalyst such as azobisisobutyronitrile and dimethyl azoisobutyrate; organic peroxygen compounds such as benzyl peroxide, t-butyl peroxide, diisopropylbenzene hydroperoxide and t-butyl hydroperoxide. Of these initiators, the azo catalyst is preferred. In addition to the aforementioned ingredients, the polymerization recipe optionally includes chain transfer agents such as isopropyl alcohol, chelating agents, buffers, salts and the like.

The oxazoline or oxazine polymer, copolymer or terpolymer so prepared is dispersed in water or a water-miscible cosolvent and mixed with the tertiary amine salt or monobasic salt of sulfurous acid. It is understood that all of the oxazoline or oxazine portion of the polymer can be converted to the desired anionic (i.e., sulfonate) or cationic (i.e., quaternary ammonium salt) unit by mixing the polymer with an equivalent amount or a slight excess of the desired tertiary amine salt or monobasic salt of sulfurous acid, based on the amount of azazine or oxazoline units in the polymer. It is also understood that a portion of the oxazoline or oxazine units of the polymer can remain unreacted by reacting the resulting polymer with less than an equivalent amount of the desired tertiary amine salt or monobasic salt of sulfurous acid. The reactants can also be mixed in an organic solvent in which all of the reactants are soluble. Most advantageously, the temperature of the mixture is raised from about 75° C. to about 120° C. and heating is continued for about 1 to 50 hours, most preferably for about 20 to about 30 hours. The resulting product is then isolated using conventional means.

The molecular weight of the polymers so prepared is not particularly critical and is dependent upon the method of preparation employed. Typical molecular weights can range from about 10,000 to several million.

The following examples are given for the purpose of illustrating the present invention and are not to be construed as limiting its scope. Unless otherwise indicated, all parts and percentages are by weight.

EXAMPLE 1

A homopolymer of 2-acrylamido-ethane-1-sulfonic acid is prepared as follows. A homopolymer of 2-isopropenyloxazoline is prepared by a conventional free radical polymerization technique. An aqueous mixture of the polymer weighing 75 g (25 percent solids, 0.17 meq. of oxazoline) and 16 g (84 mmoles) of sodium bisulfite is prepared in 50 ml of water. The mixture is heated on a steam bath for 2 hours and cooled to room temperature. The polymer is isolated by precipitation from methanol and dried in a vacuum oven at 50°–60° C. The recovered polymer weighs about 22 g.

EXAMPLE 2

A copolymer of acrylamide and 2-acrylamido-ethane-1-sulfonic acid is prepared as follows. A copolymer gel of acrylamide and isopropenyloxazoline is prepared by solution polymerization. The polymer is 83 percent acrylamide and 17 percent isopropenyloxazoline. An aqueous solution of copolymer (15 percent solids, 23 meq. of oxazoline) and 5.2 g (27 mmoles) of sodium bisulfite weighing 99 g is prepared in 10 ml of water. The final product is reacted and isolated as described in Example 1.

EXAMPLE 3

A homopolymer of methacryloylethyl trimethyl ammonium chloride is prepared as follows. A homopolymer of 2-isopropenyloxazoline is prepared by a free radical polymerization technique. A 2.7 g aqueous mixture of the polyisopropenyloxazoline (25 percent solids, 6 meq. oxazoline) and 0.7 g (7 mmoles) of trimethylamine hydrochloride is mixed. The mixture is heated for 24 hours at 100° C. in a sealed vial. The mixture is cooled to room temperature and the polymer is isolated by precipitation from acetonitrile.

EXAMPLE 4

A homopolymer of 2-isopropenyloxazoline is prepared by a conventional free radical polymerization technique. An aqueous mixture of the polymer weighing 5 g (25 percent solids, 10 meq. of oxazoline) and 1.5 g (0.01 mol) of pyridine hydrochloride is mixed at room temperature. The mixture is heated for 17 hours at 100° C. in a sealed vial, cooled to room temperature and the polymer is isolated by precipitation from acetonitrile. The polymer is dissolved in methanol, reprecipitated from tetrahydrofuran, and dried. The recovered polymer weighs about 0.8 g.

What is claimed is:
1. A process for preparing a polymer containing at least one pendant quaternary nitrogen atom wherein a

2-alkenyloxazoline or a 2-alkenyloxazine is subjected to vinyl polymerization and the resulting polymer comprising at least one pendant 2-oxazoline or 2-oxazine functionality is reacted with at least one tertiary amine salt under conditions such that said pendant 2oxazoline or 2-oxazine functionality is converted to a quaternary ammonium salt.

2. A process of claim 1 wherein said 2-alkenyloxazoline or 2-alkenyloxazine is subjected to vinyl polymerization with at least one other ethylenically unsaturated monomer.

3. A process of claim 2 wherein said other monomer is an ethylenically unsaturated water-soluble monomer.

4. A process of claim 2 wherein the other monomer is an ethylenically unsaturated, water-soluble monomer and/or an ethylenically unsaturated, water-insoluble monomer.

5. A process of claim 4 wherein a polyvinyl crosslinking monomer is polymerized therewith.

6. A process of claim 1 wherein said 2-alkenyloxazoline is selected from the group consisting of 2-isopropenyloxazoline, 2-vinyloxazoline and 5-methyl-2-isopropenyloxazoline.

7. A process of claim 1 wherein said tertiary amine salt is selected from the group consisting of the acid salt of tributylamine, the acid salt of triethylamine, the acid salt of triethanolamine, the acid salt of pyridine, the acid salt of dimethylaniline and the acid salt of trimethylamine.

8. A process of claim 1 wherein said polymer comprising a pendant 2-oxazoline or 2-oxazine functionality is reacted with an equivalent amount or a slight excess of said tertiary amine salt, based on the amount of oxazoline or oxazine units in the polymer.

9. A process of claim 1 wherein said polymer comprising a pendant 2-oxazoline or 2-oxazine functionality is reacted with less than an equivalent amount of said tertiary amine salt, based on the amount of oxazoline or oxazine units in the polymer.

10. A process of claim 1 wherein a homopolymer of 2-isopropenyloxazoline is reacted with trimethylamine hydrochloride in order to provide a homopolymer of methacryloylethyl trimethyl ammonium chloride.

* * * * *